United States Patent
Warren et al.

(10) Patent No.: US 10,731,506 B2
(45) Date of Patent: Aug. 4, 2020

(54) CAPACITANCE BASED WEAR INDICATOR

(71) Applicant: United Technologies Corporation, Farmington, CT (US)

(72) Inventors: Eli Cole Warren, Wethersfield, CT (US); Ian F. Agoos, Boston, MA (US); Edward F. Dreger, Burlington, CT (US); Corey A. Benoit, Uncasville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 127 days.

(21) Appl. No.: 15/846,859

(22) Filed: Dec. 19, 2017

(65) Prior Publication Data
US 2019/0186285 A1    Jun. 20, 2019

(51) Int. Cl.
| | |
|---|---|
| *F01D 21/00* | (2006.01) |
| *G01B 7/14* | (2006.01) |
| *G01M 15/14* | (2006.01) |
| *F01D 11/12* | (2006.01) |

(52) U.S. Cl.
CPC .......... *F01D 21/003* (2013.01); *F01D 11/122* (2013.01); *G01B 7/14* (2013.01); *G01M 15/14* (2013.01); *F05D 2220/32* (2013.01); *F05D 2240/11* (2013.01); *F05D 2260/83* (2013.01)

(58) Field of Classification Search
CPC ....... F01D 21/003; F01D 11/122; G01B 7/14; G01M 15/14; F05D 2240/11; F05D 2220/32; F05D 2260/83
See application file for complete search history.

(56) References Cited

U.S. PATENT DOCUMENTS

| | | | |
|---|---|---|---|
| 7,026,909 B2* | 4/2006 | Glozman | G01K 1/12 338/229 |
| 7,270,890 B2* | 9/2007 | Sabol | C23C 4/18 428/632 |
| 7,582,359 B2* | 9/2009 | Sabol | F01D 17/02 428/469 |
| 7,677,079 B2 | 3/2010 | Radziszewski et al. | |

(Continued)

FOREIGN PATENT DOCUMENTS

| | | |
|---|---|---|
| EP | 105588509 A | 5/2016 |
| GB | 2449709 A | 12/2008 |
| WO | 2005083411 A1 | 9/2005 |

OTHER PUBLICATIONS

European Search Report dated May 9, 2019 for corresponding European Patent Application No. 18214224.0.

*Primary Examiner* — Freddie Kirkland, III
(74) *Attorney, Agent, or Firm* — Bachman & LaPointe, P.C.

(57) ABSTRACT

A wear indicator for detecting blade clearance in a gas turbine engine includes a capacitor connected to a first conductor and a second conductor. The capacitor includes a multiple of layers arranged transverse to a rub direction, each layer separated by an insulator and including a first plate, a second plate, and a dielectric between the first plate and the second plate. A method of detecting blade clearance in a gas turbine engine, includes determining a change in capacitance between the first and second capacitance and determining an amount of material removed from the wear indicator by the blade corresponding to the change in capacitance.

20 Claims, 11 Drawing Sheets

(56) References Cited

U.S. PATENT DOCUMENTS

| | | | | |
|---|---|---|---|---|
| 8,132,467 B2* | 3/2012 | Shinde | ............... | G01N 3/56 |
| | | | | 73/774 |
| 8,177,474 B2 | 5/2012 | Andarawis et al. | | |
| 8,560,266 B2 | 10/2013 | Zielinski | | |
| 8,684,669 B2* | 4/2014 | Chehab | ............. | F01D 11/122 |
| | | | | 415/118 |
| 8,742,944 B2* | 6/2014 | Mitchell | ............. | F01D 17/02 |
| | | | | 340/870.01 |
| 8,922,311 B2* | 12/2014 | Pal | ............. | H01F 27/22 |
| | | | | 29/602.1 |
| 9,395,171 B2* | 7/2016 | Tevs | ............. | G01B 7/023 |
| 2005/0129089 A1* | 6/2005 | Glozman | ............. | G01K 1/12 |
| | | | | 374/185 |
| 2005/0158511 A1 | 7/2005 | Sabol et al. | | |
| 2006/0056959 A1 | 3/2006 | Sabol et al. | | |
| 2010/0117859 A1 | 5/2010 | Mitchell et al. | | |
| 2012/0207586 A1* | 8/2012 | Chehab | ............. | F01D 11/122 |
| | | | | 415/118 |
| 2017/0160070 A1 | 6/2017 | Warren | | |
| 2019/0040759 A1* | 2/2019 | Warren | ............. | F01D 11/08 |

* cited by examiner

CAPACITANCE BASED WEAR INDICATOR

BACKGROUND

The present disclosure generally relates to measurement devices, and more particularly, to a method and apparatus for detecting blade tip clearance for a gas turbine engine.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engines typically have rows of circumferentially spaced airfoils mounted on respective rotor disks for rotation about an engine axis in the compressor and turbine sections. The compressor and turbine sections maintain an optimal clearance between the tips of the rotor blades and an outside diameter of a gas path within the turbine engine to provide the conditions necessary to achieve a desired performance.

SUMMARY

A method of detecting blade clearance in a gas turbine engine according to one disclosed non-limiting embodiment of the present disclosure includes attaching a wear indicator to a surface adjacent a blade of the gas turbine engine. Then measuring a first capacitance of the wear indicator; measuring a second capacitance of the wear indicator during engine operation subsequent to measuring the first capacitance; determining a change in capacitance between the first and second capacitance; and determining an amount of material removed from the wear indicator corresponding to the change in capacitance.

A further aspect of the present disclosure includes determining a clearance between the blade and the surface corresponding to the amount of material removed from the wear indicator.

A further aspect of the present disclosure includes that measuring a distance between an engine axis and the wear indicator, and measuring a distance between the engine axis and the surface, prior to engine operation and subsequent to attaching the wear indicator.

A further aspect of the present disclosure includes determining a clearance between a blade tip of the blade and the surface corresponding to the amount of material removed from the wear indicator during engine operation.

A further aspect of the present disclosure includes that determining a clearance between a blade tip of the blade and the surface at a multiple of locations around the surface with a respective multiple of wear indicators.

A further aspect of the present disclosure includes determining a clearance between a blade tip of the blade and the surface at a multiple of times within an engine run.

A further aspect of the present disclosure includes that the multiple of times within the engine run comprises a time associated with at least one of ground idle, flight idle, max cruise, take-off, and max power.

A further aspect of the present disclosure includes attaching the wear indicator to a blade outer air seal.

A further aspect of the present disclosure includes that attaching the wear indicator comprises attaching the wear indicator such that the wear indicator is flush with the surface.

A further aspect of the present disclosure includes that attaching the wear indicator comprises attaching the wear indicator such that the wear indicator extends above the surface.

A wear indicator for detecting blade clearance in a gas turbine engine according to one disclosed non-limiting embodiment of the present disclosure includes a first conductor; a second conductor; a capacitor connected to the first conductor and the second conductor, the capacitor comprising a multiple of layers arranged transverse to a rub direction, each layer separated by an insulator and comprising a first plate, a second plate, and a dielectric between the first plate and the second plate; and a potting material encapsulating the capacitor.

A further aspect of the present disclosure includes that the multiple of layers are coiled.

A further aspect of the present disclosure includes that the potting material comprises an alumina material.

A further aspect of the present disclosure includes that the potting material comprises a ceramic material.

A further aspect of the present disclosure includes that the potting material comprises a boron nitride material.

A further aspect of the present disclosure includes a controller in communication with the first conductor and the second conductor, the controller operable to determine an amount of material removed from the wear indicator corresponding to the change in capacitance.

A method of detecting blade clearance in a gas turbine engine according to one disclosed non-limiting embodiment of the present disclosure includes attaching a wear indicator to a surface adjacent a blade of the gas turbine engine; measuring a first capacitance of the wear indicator; operating the gas turbine engine at a first selected speed for a first period of time to remove material from the wear indicator; measuring a second capacitance of the wear indicator subsequent to measuring the first capacitance; determining a change in capacitance between the second capacitance and the first capacitance; determining an amount of material removed from the wear indicator by the blade corresponding to the change in capacitance; and determining a clearance between the blade and the surface corresponding to the amount of material removed from the wear indicator.

A further aspect of the present disclosure includes at least partially embedding the wear indicator within an abradable material of a blade outer air seal.

A further aspect of the present disclosure includes arranging a multiple of layers of the wear indicator transverse to a rub direction of the blade.

A further aspect of the present disclosure includes measuring the capacitance of the wear indicator while operating the gas turbine engine.

The foregoing features and elements may be combined in various combinations without exclusivity, unless expressly indicated otherwise. These features and elements as well as the operation of the invention will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
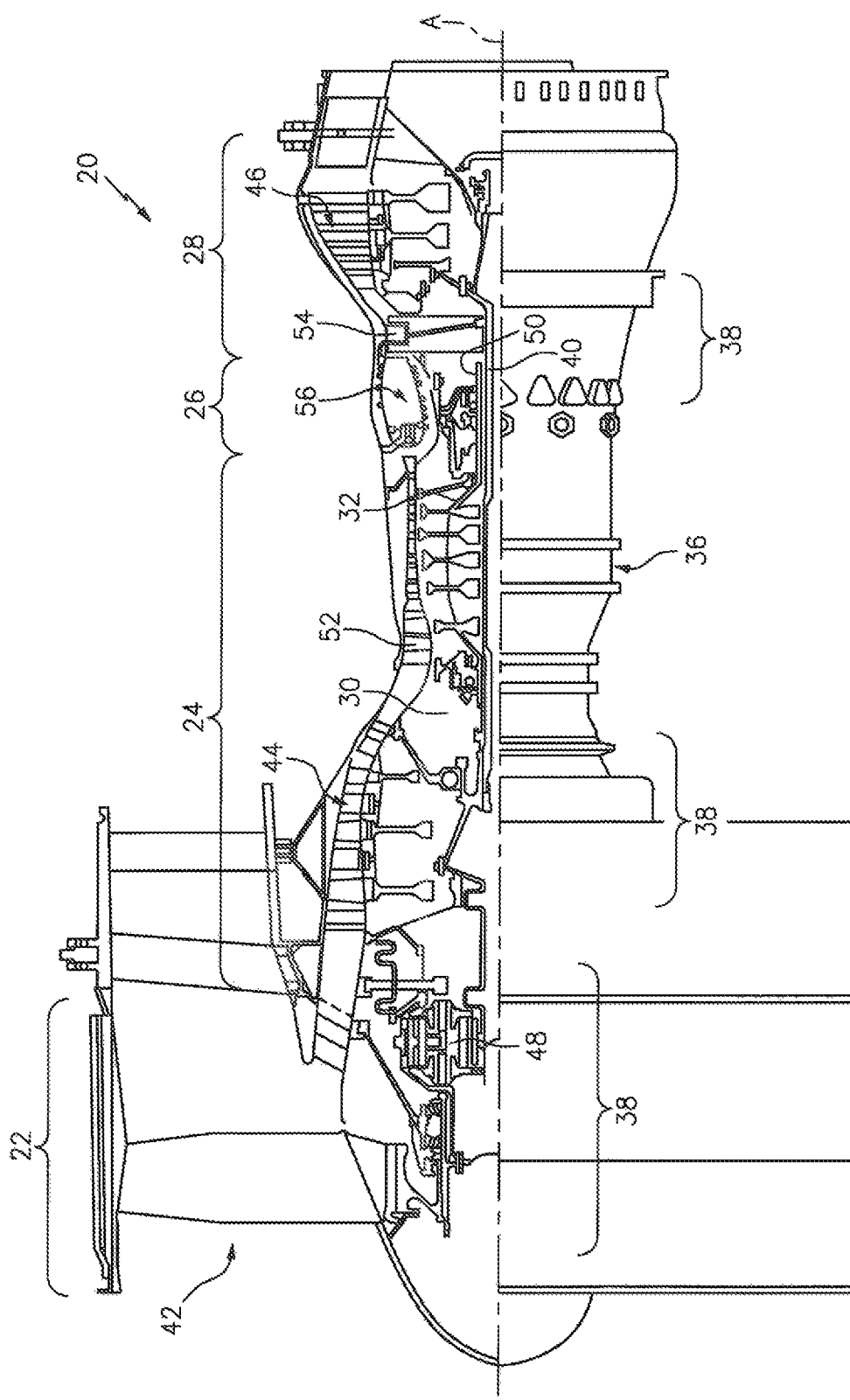
FIG. 1 is a cross-sectional illustration of a gas turbine engine.

FIG. 1 schematically illustrates a gas turbine engine 20. The gas turbine engine 20 as disclosed herein has a two-spool turbofan that generally incorporates a fan section 22, a compressor section 24, a combustor section 26, and a turbine section 28. The fan section 22 drives air along a bypass flowpath and also into a core flowpath for compression by the compressor section 24. A significant amount of thrust is provided by the bypass flow path due to the high bypass ratio. Although an example high bypass gas turbofan engine architecture is illustrated and described in the disclosed embodiments, other turbine engines may also benefit herefrom.

The gas turbine engine 20 in this example includes a low spool 30 and a high spool 32 mounted for rotation around an engine central longitudinal axis A relative to an engine case structure 36 via several bearing compartments 38. The low spool 30 generally includes an inner shaft 40 that interconnects a fan 42, a low pressure compressor ("LPC") 44, and a low pressure turbine ("LPT") 46. The inner shaft 40 drives the fan 42 either directly, or through a geared architecture 48 to drive the fan 42 at a lower rotational speed than the low spool 30. An exemplary reduction transmission is an epicyclic transmission, such as a planetary, or star gear system. The high spool 32 includes an outer shaft 50 that interconnects a high pressure compressor ("HPC") 52 and a high pressure turbine ("HPT") 54. A combustor 56 is arranged between the HPC 52 and the HPT 54. The core airflow is compressed by the LPC 44, then the HPC 52, mixed with fuel and burned in the combustor 56, then expanded over the HPT 54 and the LPT 46 to rotationally drive the respective low spool 30 and high spool 32 in response to the expansion.

Figure 2:
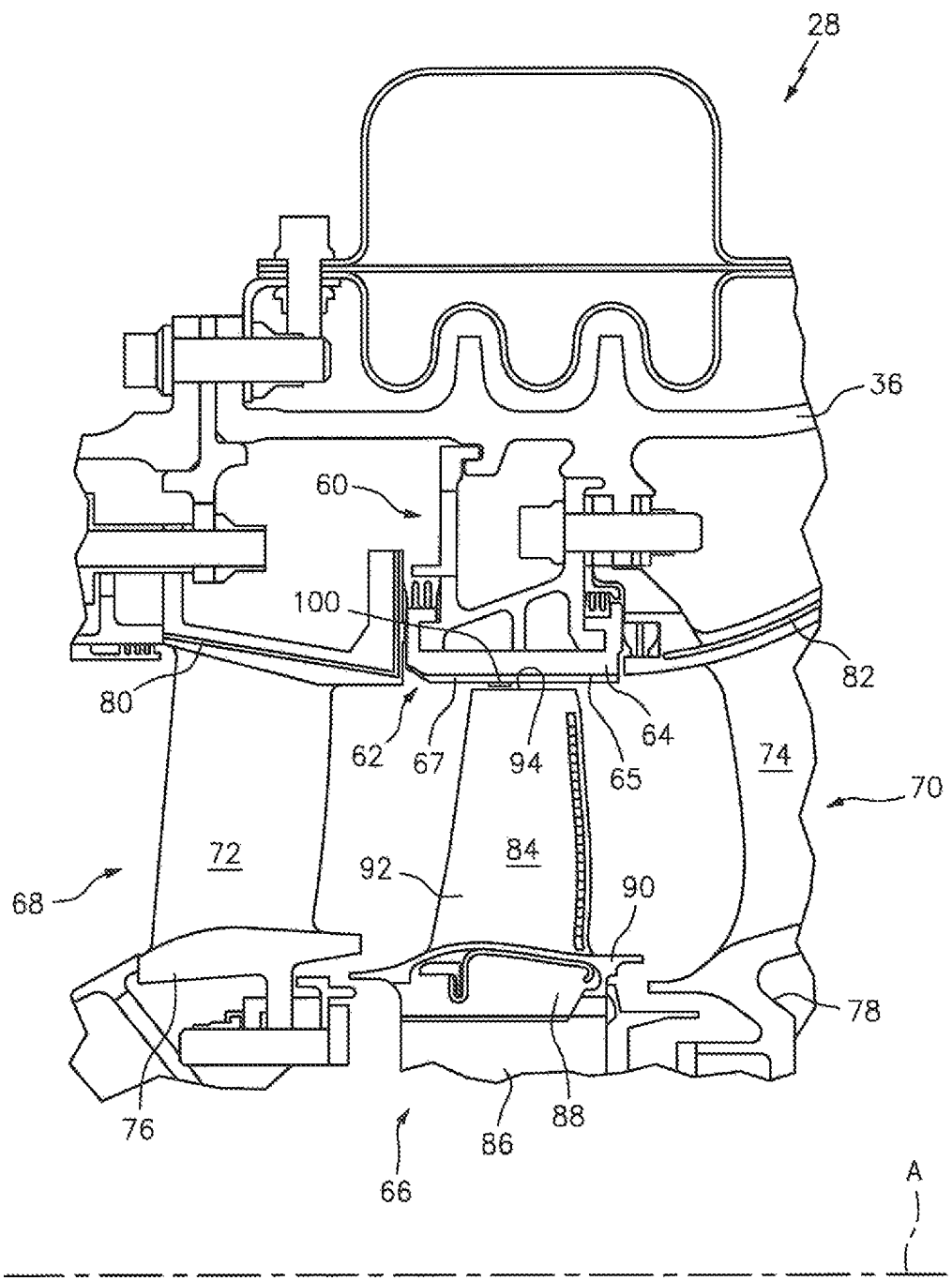
FIG. 2 is a cross-sectional illustration of a wear indicator location within a turbine section of the gas turbine engine.

With reference to FIG. 2, an enlarged schematic view of a portion of the turbine section 28 is shown by way of example; however, other engine sections such as the compressor section 24 will also benefit herefrom. A full ring shroud assembly 60 within the engine case structure 36 supports a blade outer air seal assembly 62. The assembly 62 includes a multiple of segments 64 proximate to a rotor blade assembly 66.

The blade outer air seal assemblies 62 are axially disposed between a forward stationary vane ring 68 and an aft stationary vane ring 70. Each vane ring 68, 70 includes an array of vanes 72, 74 that extend between a respective inner vane support 76, 78 and an outer vane support 80, 82. The inner vane support 76, 78 and the outer vane supports 80, 82 are attached to the engine case structure 36.

The rotor blade assembly 66 includes an array of blades 84 circumferentially disposed around a disk 86. Each blade 84 includes a root 88, a platform 90 and an airfoil 92. The blade roots 88 are received within the disk 86 such that the airfoils 92 extend radially outward so that a blade tip 94 of each airfoil 92 is adjacent to the blade outer air seal assembly 62. Each segment 64 includes a surface 65 which is adjacent to the blade tips 94. The surface 65 may be formed in part by an abradable material 67 applied to the segments 64. The blade tips 94 rotate along a blade path to define a rub direction and may contact the abradable material 67. The abradable material 67, such as yttrium oxide, abrades upon contact with the rotating blade tips 94 to, for example, form a trench in the abradable material 67 to better seal with the blade tips 94 under some operational conditions.

Figure 3:
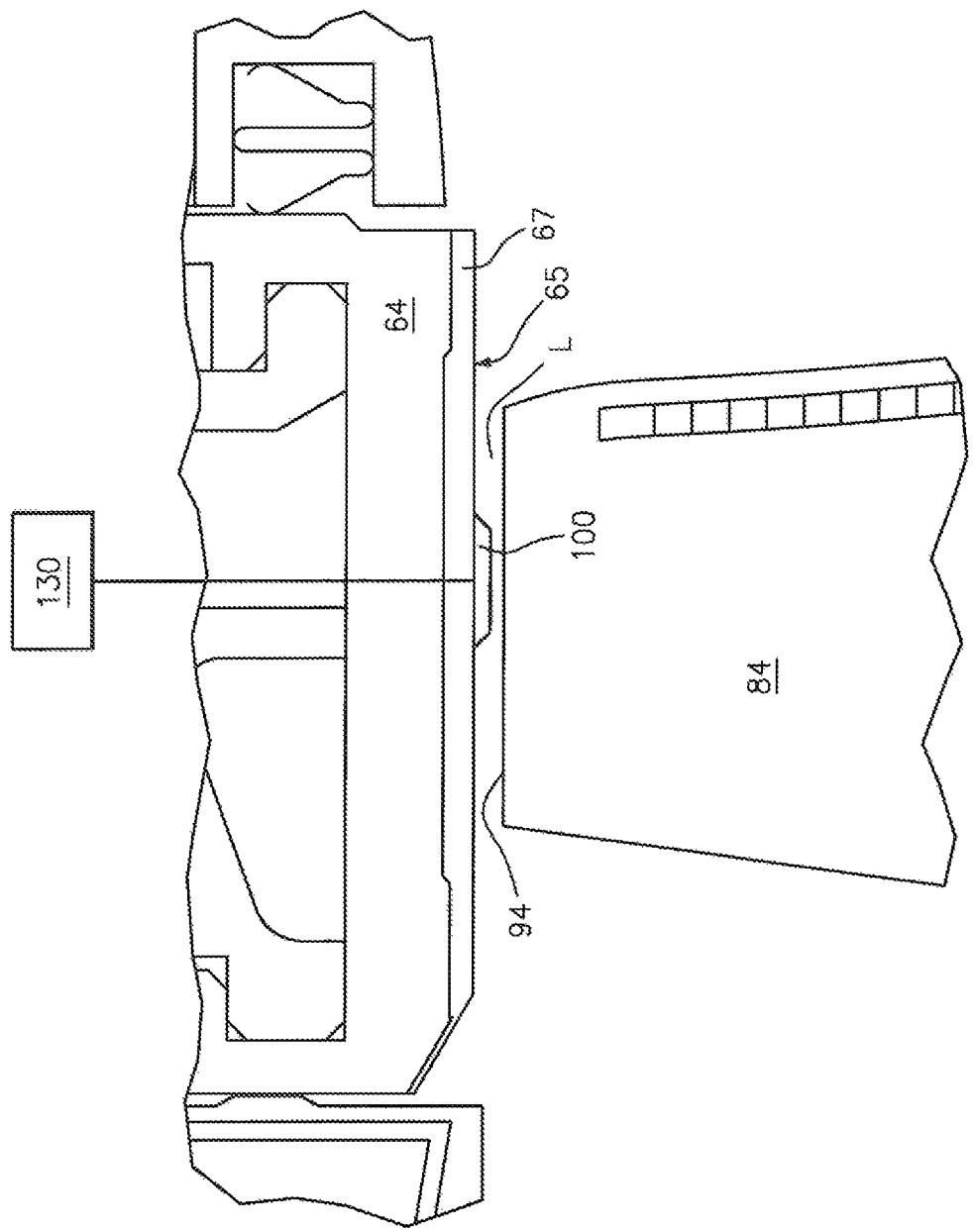
FIG. 3 is an expanded cross-sectional illustration of the wear indicator location of FIG. 2.
Figure 4:
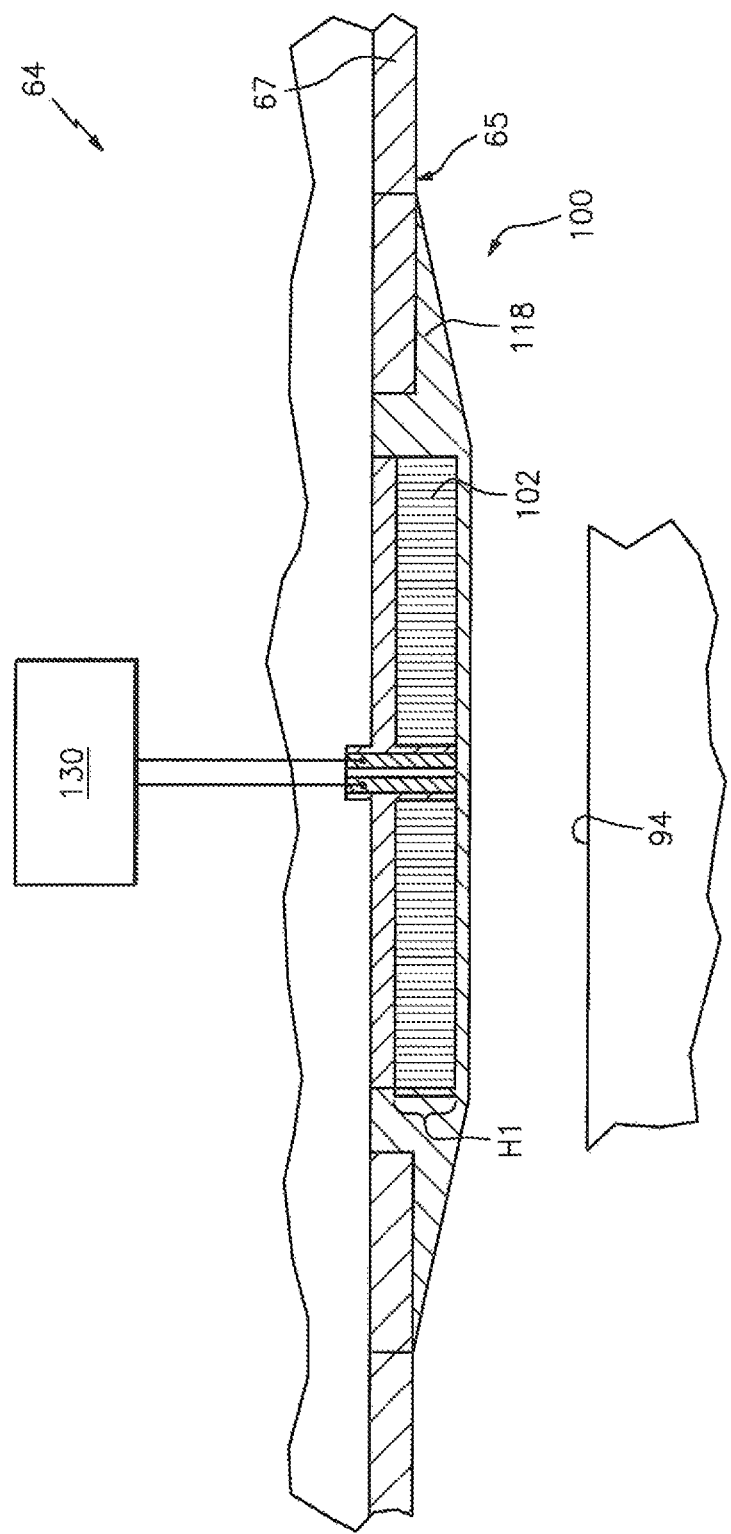
FIG. 4 is a cross-sectional illustration of the wear indicator which extends radially inwardly of a surface according to one embodiment.
Figure 5:
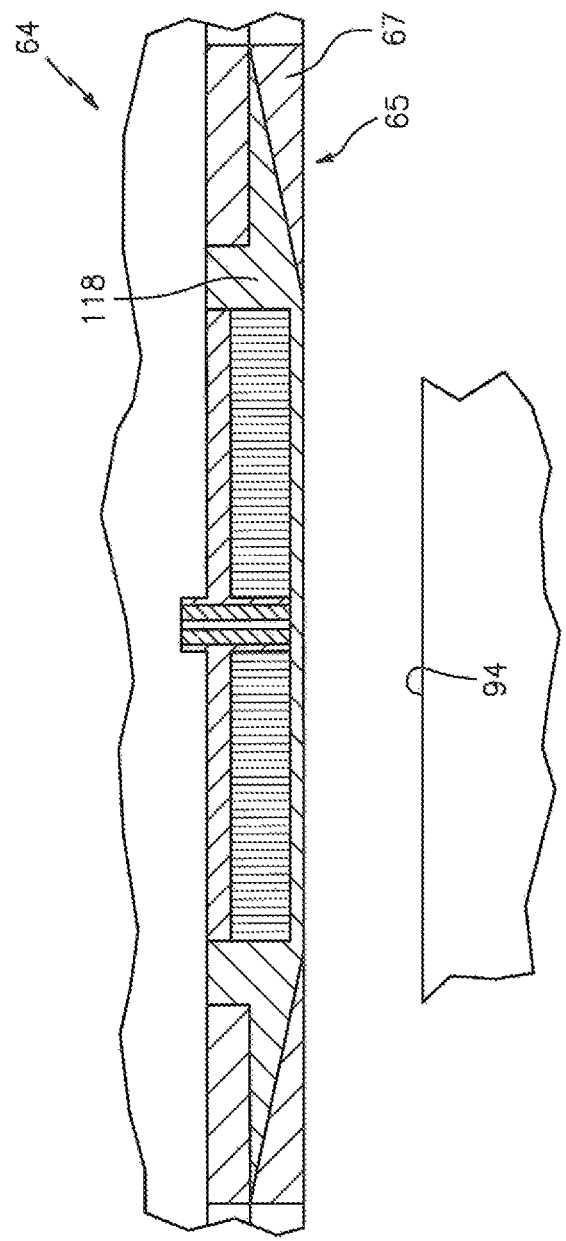
FIG. 5 is a cross-sectional illustration of the wear indicator embedded within a surface according to another embodiment.

With reference to FIG. 3, a wear indicator 100 is attached to the surface 65. In this example, the wear indicator 100 is located within the blade clearance "L" between the blade tips 94 and the surface 65. Some rotors may have more absolute close-down than others, and there are applications where the baseline runout close-down is not of interest, so an installation might ignore the first few mils. Blade clearance is designed to be very small during operation for efficiency reasons, and with relatively small blades that means the cold clearance is not much larger, and so initial clearance to the wear indicator 100 will be negligible. Additionally, there is always some cold clearance in a rotor installation that experiences close-down during operation from loading, untwist, thermal growth, etc. Depending on the cold clearance and the existence of rub material (abradable) the wear indicator 100 could be installed proud of the surface, or recessed to some degree into the surface or the abradeable. Although depicted in the turbine section, the wear indicator 100 may alternatively or additionally be located in other or additional sections of the gas turbine engine 20. In one embodiment, the wear indicator 100 may be adhesively bonded onto the abradable material 67 to extend radially inwardly (FIG. 4) from the surface 65. That is, the blade tips 94 rub the wear indicator 100 prior to contact with the surface 65 as the wear indicator 100 extends radially inwardly from the surface 65. In another embodiment, the wear indicator 100 is embedded (FIG. 5) at least partially within the abradable material 67 to be flush with the surface 65. That is, the blade tips 94 rub the wear indicator 100 simultaneously with the surface 65. Multiple wear indicators 100 may be located to measure blade clearance at multiple circumferential positions. In one example, over one hundred wear indicators 100 may be attached around a single rotor blade assembly 66.

Figure 6:
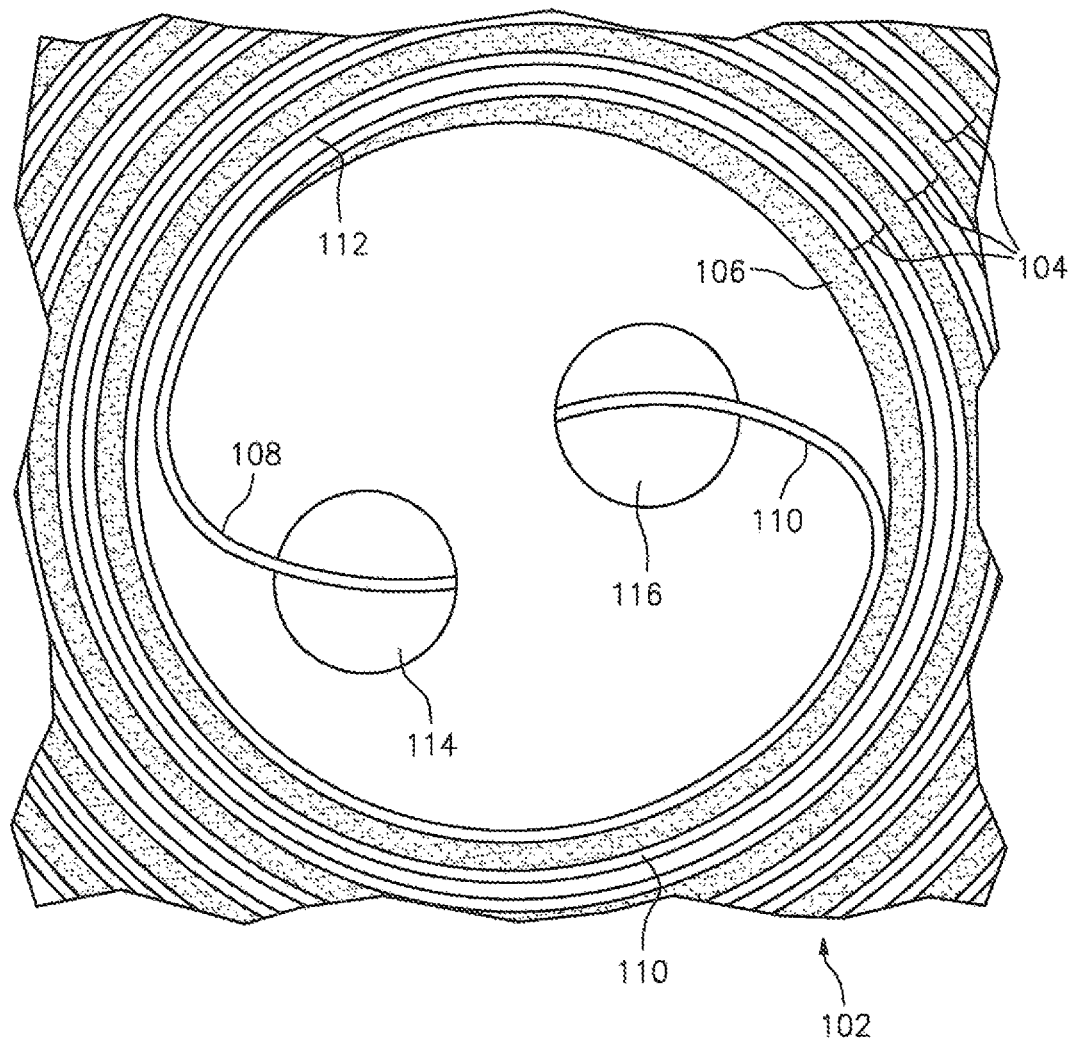
FIG. 6 is a sectional view of the wear indicator taken in a rub direction along line 6-6 in FIG. 7.

With reference also to FIG. 6, each wear indicator 100 includes a capacitor 102 formed of a multiple of layers 104 that define a height H1 (FIG. 4) transverse to the rub direction. The height H1 (FIG. 4) of the capacitor 102, in one example, may be 0.05 inches (1.3 mm). Each layer 104 is separated by an insulator 106 and includes a first plate 108, a second plate 110, and a dielectric 112 between the first plate 108 and the second plate 110. The first plate 108 is connected to a first conductor 114 and the second plate 110 is connected to a second conductor 116. The multiple of layers 104 may be of various configurations such as a coiled arrangement, a linear arrangement, or other arrangement that are encapsulated in a potting material 118. The coiled embodiment was chosen for a higher capacitive density for circumferential surface area, however, various capacitor geometries that have a definable change in capacitance with changes in amount of remaining material can alternatively or additionally be used such as a single parallel plate capacitor with the plates perpendicular to the circumferential tangent (on end in the radial direction).

Figure 7:
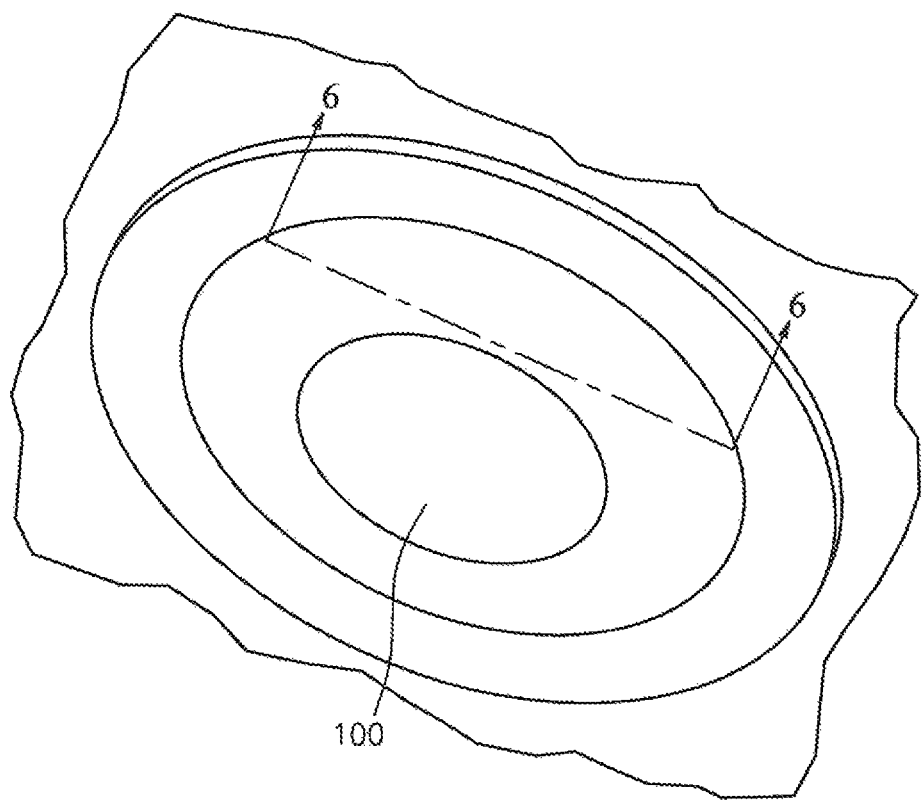
FIG. 7 is a perspective view of a wear indicator in a conical frustum shape according to one embodiment.

Since the wear indicator 100 is to be located within a core flow path of the gas turbine engine 20, the potting material 118 (FIG. 4) may be formed in a conical frustum shape (FIG. 7) as such a shape is aerodynamic and facilitates clean shearing by the blade tips 94. The potting material 118 may be manufactured of a non-conductive material that insulates the capacitor 102 and withstands the high temperatures within the gas turbine engine. The type of potting material 118 may be specifically selected in relation to the material from which the blades 84 are manufactured. For example, the potting material 118 may be a boron nitride material for use with a relatively soft compressor blade material. In another example the potting material 118 may be an alumina material or other ceramic material for a relatively hard turbine blade material.

The first conductor 114 and the second conductor 116 are in communication with a controller 130. The controller 130 is operable to determine the change in capacitance and thus a corresponding amount of material removed from the wear indicator 100. The controller 130 may include a processor, a memory, and an interface. The processor can be any type or combination of computer processors, such as a microprocessor, microcontroller, digital signal processor, application specific integrated circuit, programmable logic device, and/or field programmable gate array. The memory may include any type of computer readable medium that stores the data and control algorithms described herein such as a non-transitory computer readable storage medium tangibly embodied in, for instance, as firmware, or operably connected to, one or more wear indicators 100 via the interface. Other operational software for the processor may also be stored in the memory.

Figure 9:
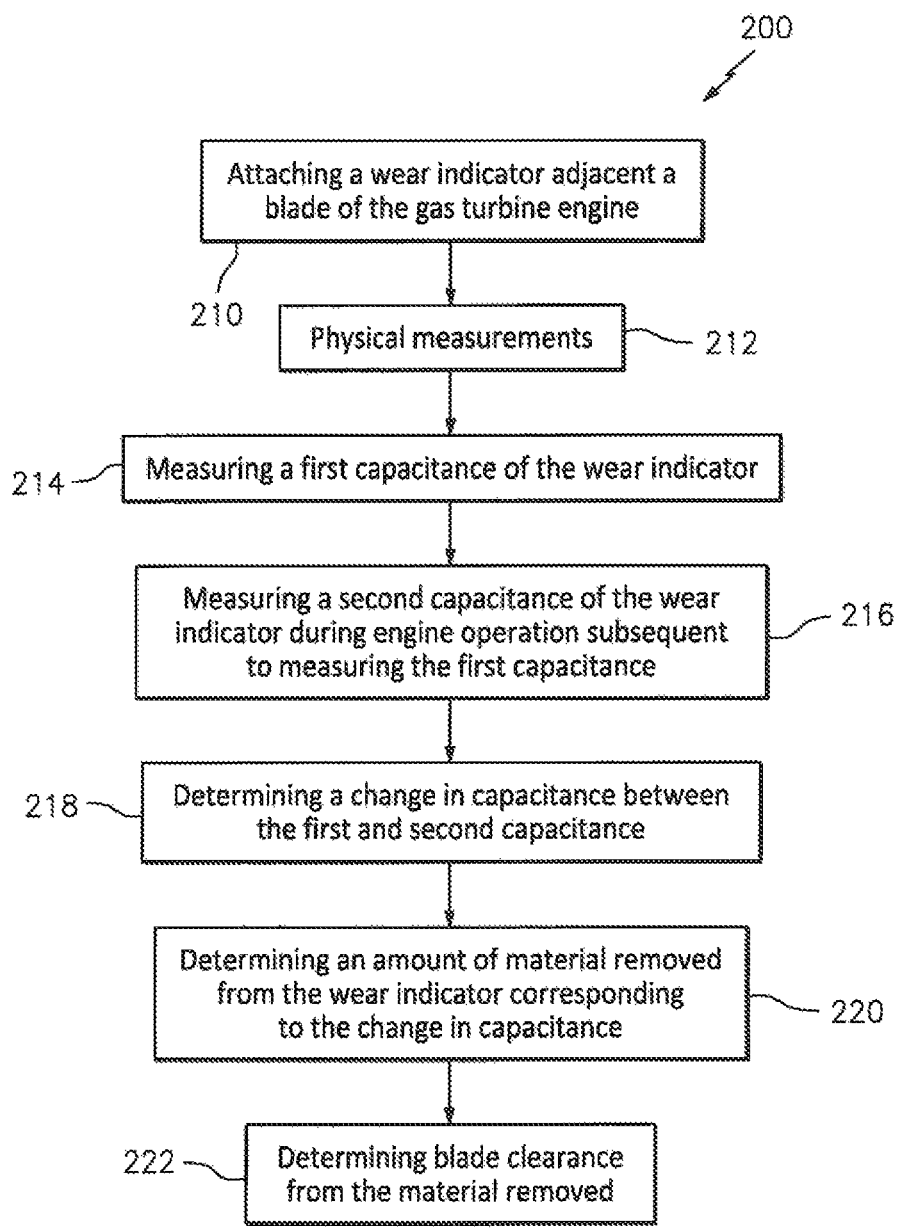
FIG. 9 is a flow chart illustrating a method of detecting blade clearance with a wear indicator during gas turbine engine operation.

With reference to FIG. 9, a method 200 for detecting blade clearance in the gas turbine engine is disclosed in terms of block diagrams. Initially, the wear indicator 100 is attached (210) to the surface 65 of the gas turbine engine adjacent the array of blades 84 of the gas turbine engine. Once the wear indicator 100 is attached, and prior to engine operation, reference measurements (212) may be acquired by a measurement device such as a coordinate measuring machine which is operable to measure physical geometric characteristics. For example, a reference measurement may be acquired between the wear indicator 100 and the engine central longitudinal axis A (FIGS. 1 and 2). A reference measurement may also be acquired from the engine central longitudinal axis A to one or more of the blade tips 94. A reference measurement may also be acquired from the engine central longitudinal axis A to the surface 65. In some embodiments, the wear indicator 100 and/or the abradable material 67 may be pre-rubbed to provide an initial desired clearance between the blade tips 94 and the wear indicator 100 and/or the abradable material 67. As numerous wear indicators 100 may be attached within a single stage, each may originally have a slightly different pre-rub installed distance from the engine central longitudinal axis A.

Figure 10:
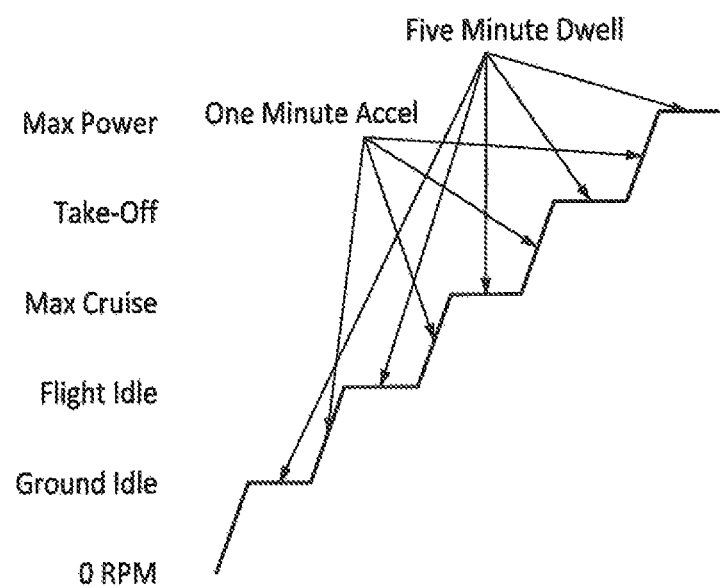
FIG. 10 is a flow chart illustrating a method of detecting blade clearance at various example points during an engine run.

A first capacitance of the wear indicator is measured (214). The first capacitance measurement may be taken prior to engine operation, after the pre-rub machining, at ground idle, at flight idle, at max cruise, at take-off, at max power, or at any other time during an engine run (FIG. 10). The measurement may be taken during, for example, flight cycles and ground tests in aerospace engines, power generation, and other turbomachinery applications.

Next, a second capacitance of the wear indicator is measured (216) subsequent to the first measurement. Operation of the wear indicator 100 provides multiple clearance/closedown measurements at multiple times during an engine run flight cycle that are minimally affected by temperature change, not only after teardown. For example, the second capacitance measurement may be taken at ground idle, at flight idle, at max cruise, at take-off, at max power, or at any other time during an engine run flight cycle (FIG. 10). The wear indicator 100 can be used as in situ calibration of non-contact tip-clearance measurement systems and can also be used to characterize as-built production engines as a production quality/performance test.

Figure 8:
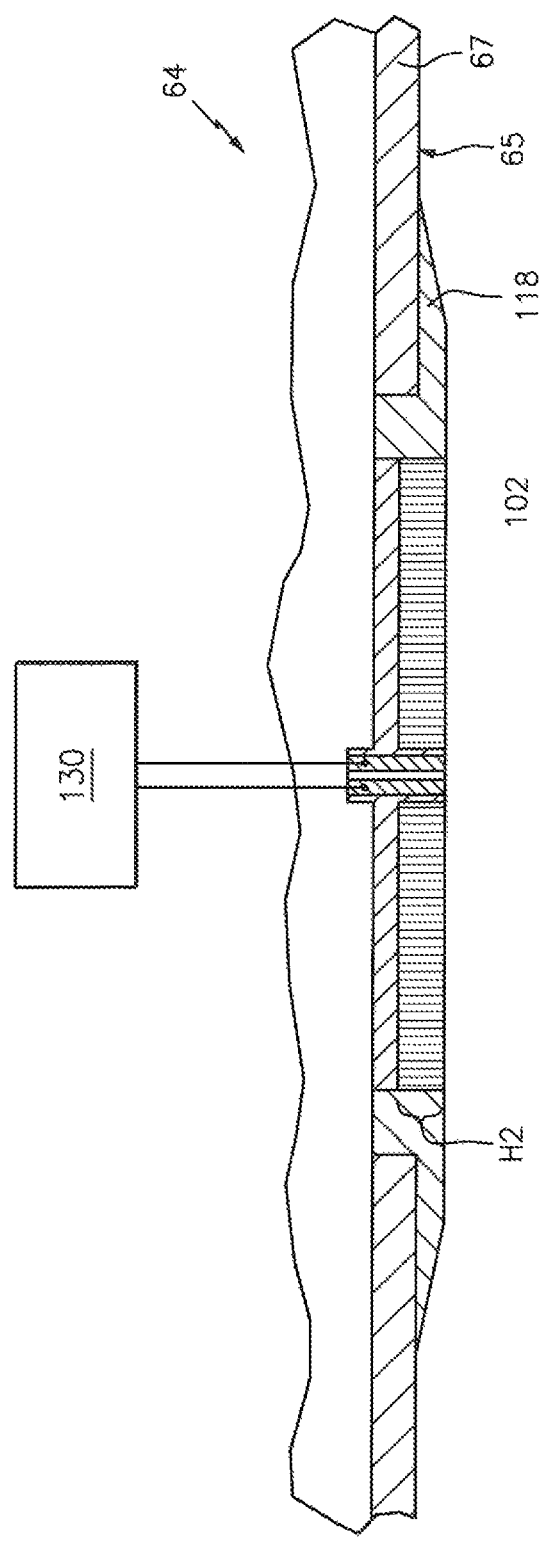
FIG. 8 is a cross-sectional illustration of the wear indicator in a rubbed condition.

Next, a change in capacitance between the first and second capacitance is determined (218). The capacitor 102 is sheared off upon passage of the blade tips 94 which reduces the height of the capacitor 102 from, for example, H1 (FIG. 4) to H2 (FIG. 8). The height reduction from H1 (FIG. 4) to H2 (FIG. 8) necessarily reduces the effective area of the capacitor 102 and thus changes the capacitance thereof. The change in capacitance may be determined on board the engine by the controller 130 or communicated off board the engine for analysis. One device operable to provide such resolution is the E4981A capacitance meter from Keysight Technologies of Englewood, Colo., United States.

Figure 11:
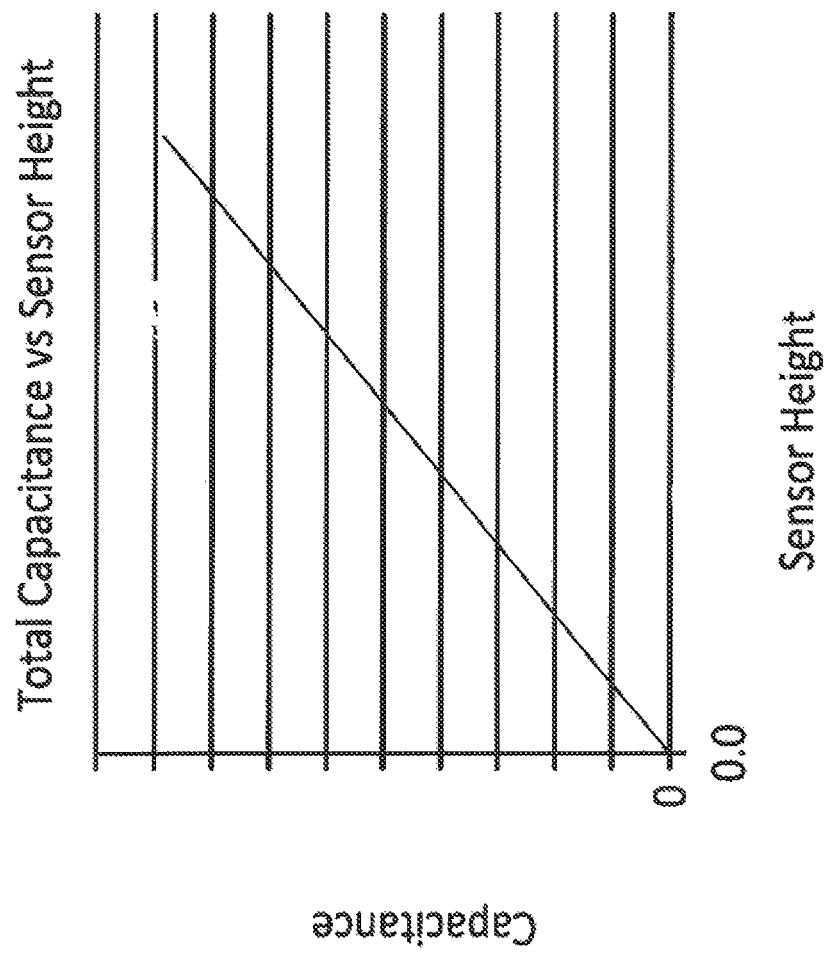
FIG. 11 is a graphical representation of capacitance in comparison to a height in the wear indicator.

Then, from the change in the capacitance, the amount of material removed from the wear indicator 100 is determined (220). In one example, a 35 picofarad (pF) change of capacitance corresponds to 0.001 inches of material removed from the wear indicator 100 (FIG. 11).

The amount of material removed from the wear indicator 100 may then be used to determine (222) a clearance between the blade tips 94 and the surface 65. The clearance data could be used to identify operational performance at several engine operating conditions and also for one-time over-rub warning. This leads to the potential for correlation of the build processes to facilitate improved manufacturing processes.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper", "lower", "above", "below" and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiments, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of detecting blade clearance in a gas turbine engine, the method comprising:
   attaching a wear indicator to an abradable material of a blade outer air seal adjacent a blade of the gas turbine engine such that the wear indicator is adjacent to a path of a blade tip;
   measuring a first capacitance of the wear indicator, the first capacitance related to a first height of the wear indicator;
   measuring a second capacitance of the wear indicator during engine operation subsequent to measuring the first capacitance, the second capacitance related to a second height of the wear indicator, the second height less than the first height;
   determining a change in capacitance between the first and second capacitance;
   determining an amount of material removed from the wear indicator corresponding to the change in capacitance; and
   determining a clearance between the blade and the surface corresponding to the amount of material removed from the wear indicator by the blade tip during engine operation.

2. The method as recited in claim 1, further comprising measuring a distance between an engine axis and the wear indicator, and measuring a distance between the engine axis and the abradable material, prior to engine operation and subsequent to attaching the wear indicator.

3. The method as recited in claim 2, further comprising determining a clearance between the blade tip of the blade and the surface corresponding to the amount of material removed from the wear indicator during engine operation.

4. The method as recited in claim 1, further comprising determining a clearance between the blade tip of the blade and the abradable material at a multiple of locations around the surface with a respective multiple of wear indicators.

5. The method as recited in claim 1, further comprising determining a clearance between the blade tip of the blade and the abradable material at a multiple of times within an engine run.

6. The method as recited in claim 5, wherein the multiple of times within the engine run comprises a time associated with at least one of ground idle, flight idle, max cruise, take-off, and max power.

7. The method as recited in claim 1, wherein attaching the wear indicator to a surface comprises attaching the wear indicator such that the wear indicator is flush with the abradable material.

8. The wear indicator as recited in claim 1, wherein the wear indicator stands proud to the abradable material.

9. The wear indicator as recited in claim 8, wherein the wear indicator is circular.

10. A wear indicator for detecting blade clearance in a gas turbine engine, comprising:
    a first conductor;
    a second conductor;
    a capacitor connected to the first conductor and the second conductor, the capacitor comprising a multiple of layers arranged transverse to a rub direction, each layer separated by an insulator and comprising a first plate, a second plate, and a dielectric between the first plate and the second plate;
    a potting material encapsulating the capacitor; and
    a controller in communication with the first conductor and the second conductor, the controller operable to determine an amount of material removed from the wear indicator corresponding to a change in capacitance to determine the clearance between the blade and the surface, wherein the wear indicator stands proud to the abradable material.

11. The wear indicator as recited in claim 10, wherein the multiple of layers are coiled.

12. The wear indicator as recited in claim 11, wherein the potting material comprises an alumina material.

13. The wear indicator as recited in claim 11, wherein the potting material comprises a ceramic material.

14. The wear indicator as recited in claim 11, wherein the potting material comprises a boron nitride material.

15. The wear indicator as recited in claim 10, wherein the wear indicator is circular.

16. The wear indicator as recited in claim 10, wherein a 35 picofarad (pF) change of capacitance corresponds to 0.001 inches of material removed from the wear indicator.

17. A method of detecting blade clearance in a gas turbine engine, the method comprising:
    attaching a wear indicator to an abradable material adjacent a blade of the gas turbine engine such that the wear indicator is adjacent to a path of a blade tip, wherein the wear indicator stands proud to the abradable material;
    measuring a first capacitance of the wear indicator, the first capacitance related to a first height of the wear indicator;
    operating the gas turbine engine at a first selected speed for a first period of time to remove material from the wear indicator;
    measuring a second capacitance of the wear indicator subsequent to measuring the first capacitance, the second capacitance related to a second height of the wear indicator, the second height less than the first height;
    determining a change in capacitance between the second capacitance and the first capacitance;
    determining an amount of material removed from the wear indicator by the blade corresponding to the change in capacitance; and
    determining a clearance between the blade and the surface corresponding to the amount of material removed from the wear indicator.

18. The method as recited in claim 17, wherein attaching the wear indicator to the surface comprises at least partially embedding the wear indicator within the abradable material of a blade outer air seal.

19. The method as recited in claim 17, wherein attaching the wear indicator comprises arranging a multiple of layers of the wear indicator transverse to a rub direction of the blade.

20. The method as recited in claim 17, further comprising measuring the capacitance of the wear indicator while operating the gas turbine engine.

\* \* \* \* \*